(12) United States Patent
Lin et al.

(10) Patent No.: US 6,766,353 B1
(45) Date of Patent: Jul. 20, 2004

(54) METHOD FOR AUTHENTICATING A JAVA ARCHIVE (JAR) FOR PORTABLE DEVICES

(75) Inventors: Jyh-Han Lin, Coral Springs, FL (US); Robert L. Geiger, Sunnyvale, CA (US); Ronald R. Smith, Coral Springs, FL (US); Alan W. Chan, Sunrise, FL (US); Sanjay Wanchoo, Lauderdhill, FL (US)

(73) Assignee: Motorola, Inc., Schaumburg, IL (US)

( * ) Notice: Subject to any disclaimer, the term of this patent is extended or adjusted under 35 U.S.C. 154(b) by 411 days.

(21) Appl. No.: 09/613,804

(22) Filed: Jul. 11, 2000

(51) Int. Cl.[7] ............................................. G06F 15/16
(52) U.S. Cl. ....................................... 709/203; 709/201
(58) Field of Search ................................. 713/200, 201, 713/156, 168; 709/200, 203, 225, 229, 226, 217

(56) References Cited

U.S. PATENT DOCUMENTS

| | | | |
|---|---|---|---|
| 5,987,608 A | 11/1999 | Roskind | 713/200 |
| 6,023,764 A | 2/2000 | Curtis | 713/200 |
| 6,029,000 A | 2/2000 | Woolsey et al. | 395/705 |
| 6,044,467 A | 3/2000 | Gong | 713/200 |
| 6,341,353 B1 * | 1/2002 | Herman et al. | 713/201 |
| 6,351,816 B1 * | 2/2002 | Mueller et al. | 713/201 |
| 6,378,075 B1 * | 4/2002 | Goldstein et al. | 713/200 |
| 6,381,696 B1 * | 4/2002 | Doyle | 713/156 |
| 6,477,647 B1 * | 11/2002 | Venkatraman et al. | 713/193 |
| 6,523,067 B2 * | 2/2003 | Mi et al. | 709/229 |
| 6,606,708 B1 * | 8/2003 | Devine et al. | 713/201 |

* cited by examiner

Primary Examiner—Mehmet B. Geckil
(74) Attorney, Agent, or Firm—Scott M. Garrett

(57) ABSTRACT

A signed application descriptor file (206) is used instead of X.509 certificates to authenticate a portable application code, such as a JAVA archive (JAR) file. The signed ADF includes an application descriptor file (302), file hash (304) of the JAR file (301), a developer descriptor file (308), signed time stamp (310), and a developer's certificate (312). A network client device (202) includes limited computing resources (212) and a virtual machine environment for executing the portable code (208). Furthermore the client device contains a set of cryptographic, digital keys for authenticating parts of the signed ADF, which are further used to authenticate the JAR file.

8 Claims, 3 Drawing Sheets

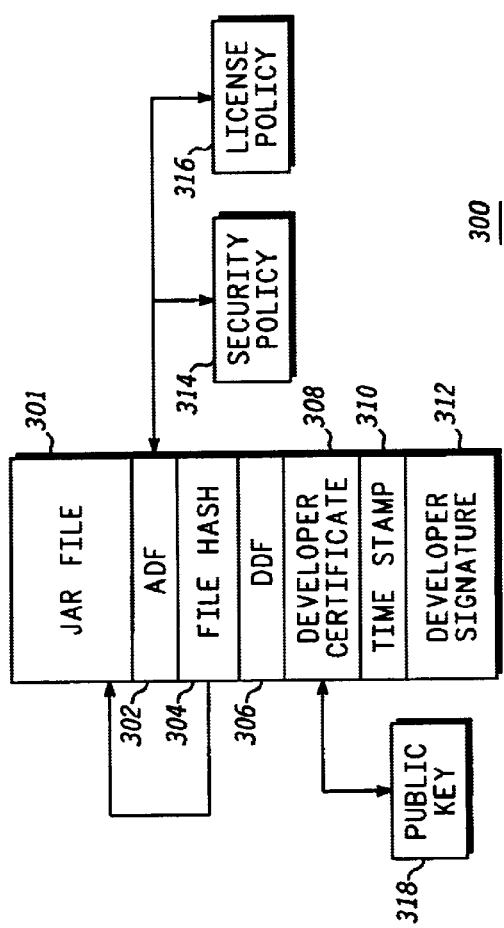
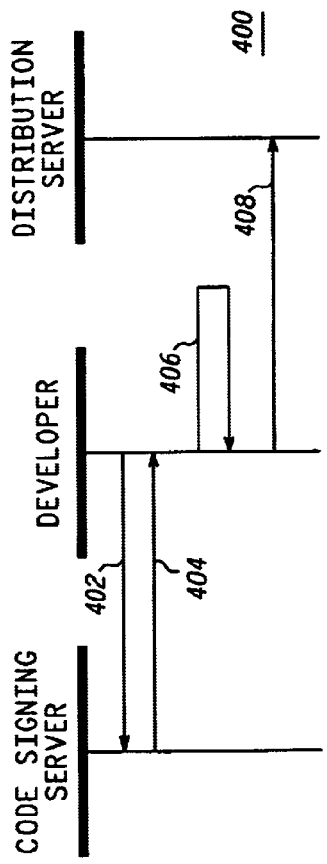
FIG. 3
FIG. 4

US 6,766,353 B1

METHOD FOR AUTHENTICATING A JAVA ARCHIVE (JAR) FOR PORTABLE DEVICES

TECHNICAL FIELD

This invention relates in general to portable code transfer, such as JAVA technology, and more particularly to security and authentication of portable code for use by wireless or mobile devices, or other computing devices with relatively limited computing resources, and limited communication bandwidth.

BACKGROUND OF THE INVENTION

In networked environments such as the Internet, the use of portable code or portable applications has gained widespread acceptance. The best known technology in this field is JAVA. In creating JAVA code, a developer creates an application and makes it available on a network in byte code format. The byte code is downloaded by various client devices connected to the network and loaded into a JAVA virtual machine environment on the client machine or computer. The virtual machine environment is a layer of software that can interact with the specific computing platform of the particular client device and interpret the byte code. An application so loaded onto a client device could compromise the client device, and may even be designed to do so if the developer of the application had malicious intentions. Therefore, security is a significant issue with portable code.

Many security schemes have been devised to address these security issues. These range from giving only very restricted access to all portable applications to a system of authentication in which different levels of permission may be granted depending on whether the application can be authenticated as having come from a trusted source. The later scheme is more preferable since it allows an application more access to the local computer's resources, so long as it is authenticated. This allows developers to create more powerful applications because the applications have more access to the computer resources of the client machine.

However, as presently devised, these authentication schemes are designed for general purpose personal computers, which are commonly referred to as "desktop" computers. These machines have varying degrees of computing resources, but in general the resources they have greatly exceed the computing resources of small, portable devices such as personal organizers and mobile communication devices. There is an increasing number of these smaller devices being manufactured that are able to connect to large networks, and particularly the internet. Presently X.509 certificates are widely used for authentication, but these are quite large files compared to the limited memory resources available on these smaller mobile devices. Furthermore, since the certificate comes bundled with the application typically, the device must load both the application and the certificate. Therefore a data structure and method of authenticating portable applications that can be used by smaller devices is needed.

BRIEF DESCRIPTION OF THE DRAWINGS

FIG. 3 shows a block diagram of a signed application descriptor file (ADF) for use in accordance with the present invention;

FIG. 4 shows a sequence chart for creating a signed ADF in accordance with the invention;

DETAILED DESCRIPTION OF A PREFERRED EMBODIMENT

Figure 1:
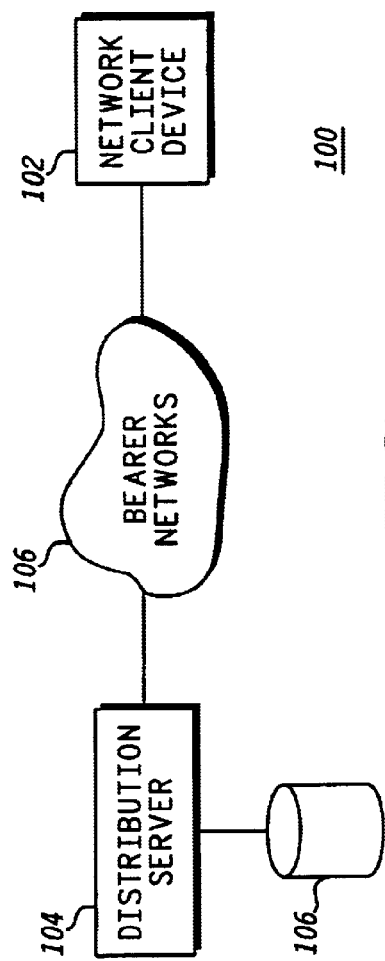
FIG. 1 shows a typical network including a server and a client.

While the specification concludes with claims defining the features of the invention that are regarded as novel, it is believed that the invention will be better understood from a consideration of the following description in conjunction with the drawing figures, in which like reference numerals are carried forward. A brief description of the prior art is also thought to be useful.

The present invention solves the problem of downloading portable applications and authenticating their source onto client device with limited computing resources by creating a signed application descriptor file (ADF), and a developer descriptor file (DDF). The ADF is a file that describes the portable application in terms of the computing resources it requires, and can be loaded onto the client device first so that the client device can determine whether or not it has sufficient resources, or it can let the user of the client device determine if there are sufficient resources. The ADF file is signed by the developer of the corresponding application using a certification authority, which is a well known and trusted signing authority. Attributes in the signed ADF correspond to those of the application so that if the user of the client device decides to load the application, the application can be authenticated against the signed ADF. The DDF is associated with a particular application software developer and specifies the general access control related information assigned to the developer. For example, a DDF may restrict the kind of application libraries that applications developed by the developer can use, or the security domain to which the developer belongs.

Referring now to FIG. 1, there is shown a typical network 100 over which client and server machines interact. In particular, a network client device 102, such as a mobile communication device, connects with a distribution server 104 over one or more bearer networks 106. Typically the bearer network includes a TCP/IP network, and for public distribution of software, it includes the Internet. However, numerous private networks are connected to the Internet through various gateways and portals, including many wireless mobile communication networks. Indeed, the present invention is suited particularly well to use on mobile communication devices such as Internet capable mobile or cellular radio telephones. These devices may use what is referred to as a "microbrowser" to view information, or "content", placed on the Internet and other networks accessible by the device, as well as execute portable code. As with general purpose computers, there is a desire to load portable applications onto these devices. Developers of portable applications provide the application on a database 106 of the distribution server 104. Client devices access the distribution server over the network and receive the desired portable code or portable application over the connection. This is one way which JAVA code sections, such as applets, are distributed.

Figure 2:
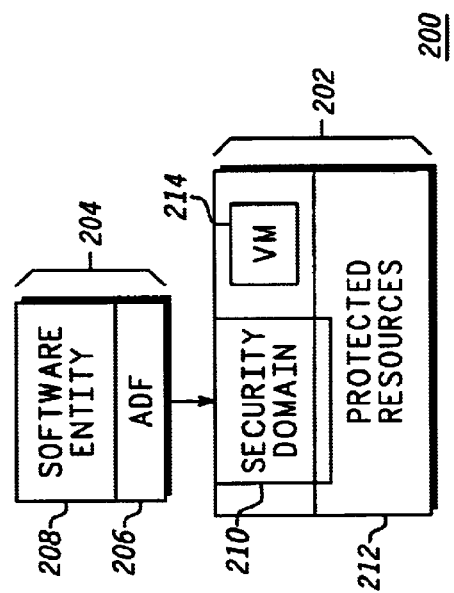
FIG. 2 shows a representation of a client network device and its computing resources.

Referring to FIG. 2 there is shown a representation 200 of a client network device 202 and its computing resources. In this instance, the client device is receiving an application file 204, which includes a signed ADF 206 and the application code 208. The application code may be, for example, a JAVA archive (JAR) file. These two parts maybe transferred separately or together. The signed ADF prescribes the security domain 210 of the application when loaded into the client device. Essentially, the security domain determines which of the client device's resources 212 the application will be allowed to access when running in the virtual machine environment 214. In the preferred embodiment, the application is received in the form of byte code which the virtual machine executes. The virtual machine only allows the application to access the resources permitted, as dictated by the signed ADF. The resources 212 include other processes, classes, and methods, as well as certain hardware components such as volatile and non-volatile memory space. The signed ADF is substantially smaller than the presently used signed JAR file format because a signed JAR file includes all applications-related files, and is more desirable for use with computing devices with relatively limited resources.

Referring now to FIG. 3, there is shown a block diagram 300 of a signed application descriptor file (ADF) for use in accordance with the present invention, along with an associated JAR file 301 containing the portable code to be installed on the client machine. The signed ADF includes an application descriptor file 302, a file hash 304 of the JAR file, a developer descriptor file (DDF) 306, a developer certificate 308, a time stamp 310, and a developer signature 312. ADF 302 describes the resources which are required by the client device, and may include a security policy file 314 or a license policy file 316, or both. The ADF contains a pointer to the network location of the application in the file hash 304, an indication of the amount of memory space required to execute the application, and the environment necessary for execution. The security policy contains the information regarding which resources the application needs permission to use, as well as the names of files the application may create, and the network addresses it may need to access. The license policy may be used to set how the application may be used, such as whether it has a finite number of uses, or a finite period of time, whether it may be transferred to other users, and so on. The file hash 304 is a hash of the JAR file 301, and is the result of a cryptographic method which produces a small digest that can be used to authenticate a larger file (in this case a JAR file), as is known in the art. For additional security, more than one hash may be used and included in the signed ADF using different hash algorithms, such as SHA1, MD5, or others. The DDF 306 also contains information about the JAR file, and may also include information regarding the developer. The developer's certificate is a certificate issued to the developer and includes the developers public key 318 so that the certificate may be authenticated by the client device. It also contains information about the identity of the developer, the validity period, the issuing certificate authority, the issuing date, and so on, to be used in the authentication process. The time stamp 310 is a signed time stamp. It is provided by a trusted source, such as a certificate authority or perhaps the client device's subscriber network operator. By providing a signed timestamp, the client device can determine when the application was signed, and if that time stamp is authentic. Finally, the developer's signature 312 is concatenated onto the other data structures. The developer's signature is allows the client device to authenticate the ADF.

The developer produces the signed ADF as illustrated in FIG. 4, which shows a sequence chart for creating a signed ADF 400 in accordance with the invention. The developer sends a request, containing the hash for the ADF and the developer certificate, to a code signing authority (402), and requests a signed timestamp. The code signing authority is a trusted entity, such as, for example, Verisign, Inc., or the client's network operator. It should be noted that the certificate authority and the code signing authority are not necessarily the same entity. A certificate authority manages certificates, while a code signing authority verifies developer certificates and signs ADF hash files and timestamps it. The developer generates and sends a hash of the ADF to the code signing authority and receives a signed timestamp back from the certificate authority (404). The developer then concatenates the ADF, the hash of the JAR file, the DDF, the developer's certificate, and the signed time stamp together. The developer's certificate contains a hash of the DDF. The developer signs the concatenated file (406), by adding the developer's digital signature (element 312 from FIG. 3), and the ADF is fully signed. The signed, concatenated file is the signed ADF, and is then placed on a distribution server (408), along with the application code or JAR file. The network address of the signed ADF is then made available so that client devices can download it to begin the installation and authentication procedure for the JAR file. In the preferred embodiment, the developer uses a software developer's kit (SDK), which is a set of software creation tools distributed by, for example, the creator of the virtual machine environment 214 that runs on the client device. The SDK automates this whole procedure, including steps 402–408.

Figure 5:
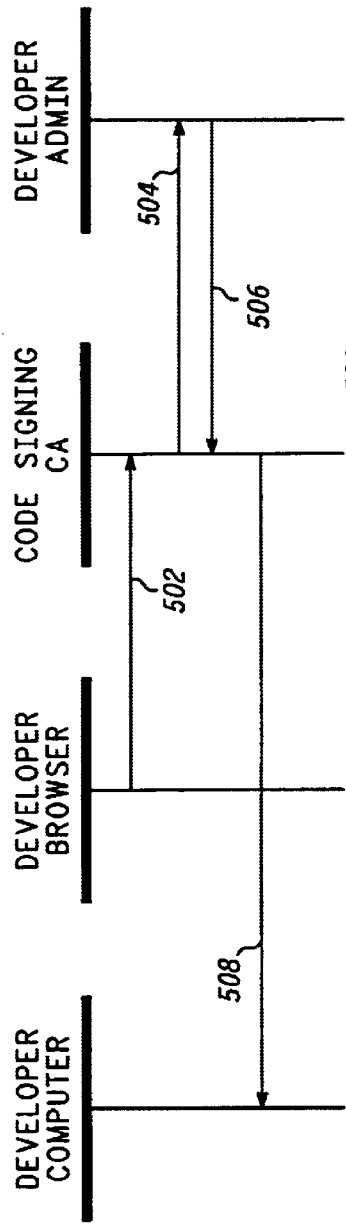
FIG. 5 shows a sequence chart for establishing the identity of a trusted developer for use in creating a signed ADF in accordance with the invention.

FIG. 5 shows the sequence 500 for obtaining a developer's certificate. The developer's browser, or similar client application, first sends a certificate request (502) to a code signing certificate authority server, which may be operated by the same certificate authority referred to above. The certificate authority sends the developer information to a developer administration server (504). This entity may be, for example, the operator of the client's home network or network service provider. For example, in the case of the client device being a wireless mobile communication device, the developer administrator may be the wireless service provider that provides the wireless communication service. The developer administrator returns a developer descriptor file (DDF) to the code signing certificate authority (506), which becomes part of the signed ADF, as described above in reference to FIG. 3. In the preferred embodiment, the developer's certificate will contain a hash of the DDF. The preferred format for the certificate is a wireless transport layer security (WTLS) certificate because it is smaller than, for example, an X.509 certificate. The certificate authority then forwards a developer certificate and the DDF, preferably both text encoded, to the developer's computer, such as, for example, by email (508). The text encoded information is easy to transfer as an email enclosure.

Figure 6:
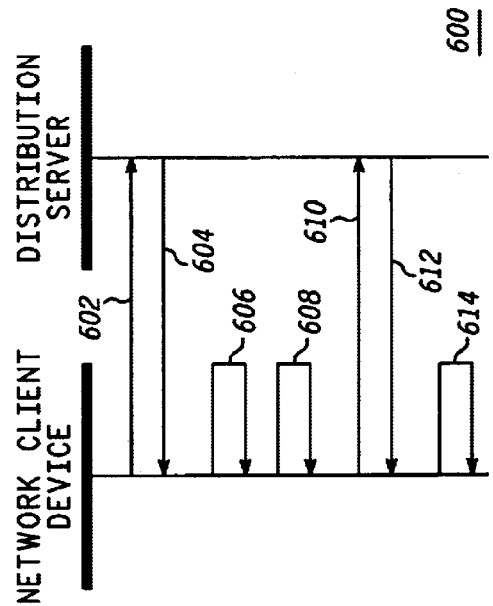
FIG. 6 shows a sequence chart for downloading a signed ADF and a portable application from a distribution server to a network client device in accordance with the invention.

After the signed ADF has been created and placed on a distribution server, client devices can download the signed ADF and the application or JAR file. The procedure is as shown in FIG. 6, which shows a sequence chart 600 for downloading a signed ADF and a portable application or JAR file from a distribution server to a network client device in accordance with the invention. Prior to beginning this sequence, the client device has had a code signing certificate authority public key and a time stamping root key placed in the client device. The time stamping root key is a public key used for authenticating the signed time stamp 310. To begin the method, the client device transmits (602) a request to a distribution server for the application. The distribution server transmits the signed ADF for the desired application, which is received by the client device (604). Preferably the signed ADF contains an application descriptor file, file hash of the application code, developer descriptor file, developer certificate, signed time stamp, and the developer certificate. These transactions take place using known network protocols, such as TCP/IP. Upon receiving the signed ADF, the client device verifies the developer certificate with the code signing certificate authority's public key (606). The client may also authenticate the signed time stamp with the time stamping root key (608). The verified timestamp is used to check whether the ADF file is signed within the valid period of the developer certificate. Both of these must be verified. If it was not already received, the client device obtains the network location of the application code or JAR file, and transmits a request to the server, specifying the particular application desired (610). Although shown here a being on the same distribution server as the signed ADF, the application may be located on a different server. The server transmits the application code to the client device (612). Upon receiving the application code, the client device compares it to the parameters in the signed ADF. Specifically, it compares the hash received in the signed ADF with the hash of the application, and may also verify attributes such as file size. The hash of the JAR file may be produced by the client device, and compared to the hash received in the signed ADF. If the hash of the application received in the signed ADF matches the hash of the received application file (in step 612), the client device loads the application into the virtual machine environment for execution according to the security and license policies, if any were present in the ADF.

Thus, the invention avoids the use of relatively large files and certificates for authenticating the application code, as is used with more powerful, general purpose computers. A typical certificate will be 100–500 bytes, the file hash about 20 bytes, the DDF about 100–200 bytes, and of course the JAR file can be very small to very large, depending on the application. The use of a signed ADF allows devices with relatively limited resources to easily authenticate the trustworthiness of an application, and to set appropriate permissions for the various resources. The security is accomplished by providing the client device with a set of keys initially, such as the code signing certificate authority key and a time stamping root key. Furthermore, developers provides their public key in the signed ADF so that client devices can use them to further establish a trusted chain. A hash of the application, and preferably a signed hash, is used so that it may be compared to the application once it is received at the client device. A security policy file and a license policy file may be provided to describe what resources the application will need, what it will create, and the limitation on the use of the application as well as the transferability of the application.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method of authenticating a JAVA archive file to be loaded onto a network client device, the network client device having a code signing certificate authority key and a time stamping root key, the method comprising:

transmitting, from the network client device, a request to a distribution server for the JAVA archive file;

receiving, at the network client device, a signed application descriptor file from the distribution server, the signed application descriptor file containing an application descriptor file, a hash of the JAVA archive file, a developer descriptor file, a developer certificate containing a developer public key, a signed time stamp, and a developer signature;

verifying the developer certificate with the code signing certificate authority key; and verifying the signed time stamp with the time stamping root key.

2. A method of authenticating a JAVA archive file as defined in claim 1, further comprising verifying the developer signature using the developer public key.

3. A method of authenticating a JAVA archive file as defined in claim 1, wherein the receiving comprises receiving the signed application descriptor file where the developer signature is a signed hash of the signed time stamp, developer certificate, developer descriptor file, application hash file, and the application descriptor file.

4. A method of authenticating a JAVA archive file as defined in claim 1, wherein the receiving comprises receiving an application descriptor file containing a security policy file.

5. A method of authenticating a JAVA archive file as defined in claim 1, wherein the receiving comprises receiving an application descriptor file containing a license policy file.

6. A method of authenticating a JAVA archive file as defined in claim 1, further comprising:

extracting a network address of the application from the signed application descriptor file; and loading the JAVA archive file from the network address.

7. A method of authenticating a JAVA archive file as defined in claim 6, wherein the network client device comprises a virtual machine environment, the method further comprising loading the JAVA archive file into the virtual machine environment.

8. A method of creating a signed application descriptor file to be used in authenticating a JAVA archive file, comprising:

generating an application descriptor file corresponding to the JAVA archive file, the application descriptor file describing the resources needed by the JAVA archive file;

generating a hash of the application descriptor file;

transmitting the hash of the application descriptor file and a developer's certificate to a certificate authority;

receiving a signed timestamp from the certificate authority in response to the transmitting; and signing an application descriptor file with the file hash, a developer descriptor file, the developer's certificate, and the signed time stamp.

* * * * *